United States Patent [19]

January et al.

[11] Patent Number: 4,629,317

[45] Date of Patent: Dec. 16, 1986

[54] VEHICLE WHEEL ALIGNMENT APPARATUS

[75] Inventors: Daniel B. January, Bel-Ridge; James R. Gender, Kirkwood, both of Mo.

[73] Assignee: Hunter Engineering Company, Bridgeton, Mo.

[21] Appl. No.: 294,830

[22] Filed: Aug. 21, 1981

[51] Int. Cl.⁴ ............................................. G01B 5/275
[52] U.S. Cl. ................................. 356/155; 33/203.18; 33/288; 356/152
[58] Field of Search .................. 356/155, 152; 33/288, 33/203.18, 336, 337, 345

[56] References Cited

U.S. PATENT DOCUMENTS

| | | |
|---|---|---|
| 3,164,910 | 1/1965 | Manlove . |
| 3,181,248 | 5/1965 | Manlove . |
| 3,199,208 | 8/1965 | Hunter ...................................... 33/336 |
| 3,426,438 | 2/1969 | Wilkerson . |
| 3,443,318 | 5/1969 | MacMillan . |
| 3,533,699 | 10/1970 | Hopkins et al. . |
| 3,865,492 | 2/1975 | Butler . |
| 4,034,479 | 7/1977 | Senften . |
| 4,106,208 | 8/1978 | Hunter . |
| 4,236,315 | 12/1980 | Curchod et al. ................. 33/203.18 |
| 4,319,838 | 3/1982 | Grossman et al. ................... 356/152 |
| 4,336,658 | 6/1982 | January et al. ..................... 356/152 |
| 4,341,021 | 7/1982 | Beissbarth ........................ 33/203.18 |

FOREIGN PATENT DOCUMENTS

| | | |
|---|---|---|
| 2934411 | 3/1981 | Fed. Rep. of Germany ... 33/203.18 |
| 2057144 | 3/1981 | United Kingdom ............ 33/203.18 |

*Primary Examiner*—R. A. Rosenberger
*Attorney, Agent, or Firm*—Gravely, Lieder & Woodruff

[57] ABSTRACT

Vehicle wheel alignment apparatus having preferred constructions in which the angle measuring components are assembled at each wheel in a unique cooperative arrangement and in which certain of the components represent existing wheel positions and other components relate the wheels in pairs so important alignment characteristics may be investigated for all wheels as well as the steerable wheels in relation to the non-steerable wheels.

7 Claims, 10 Drawing Figures

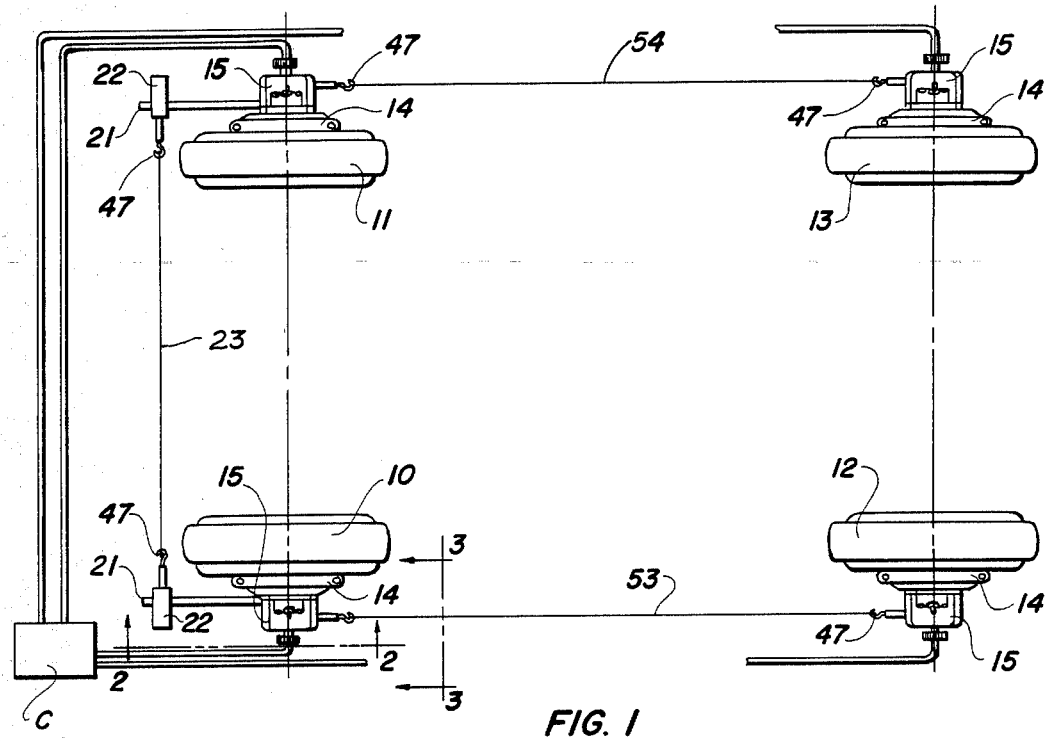
FIG. 1
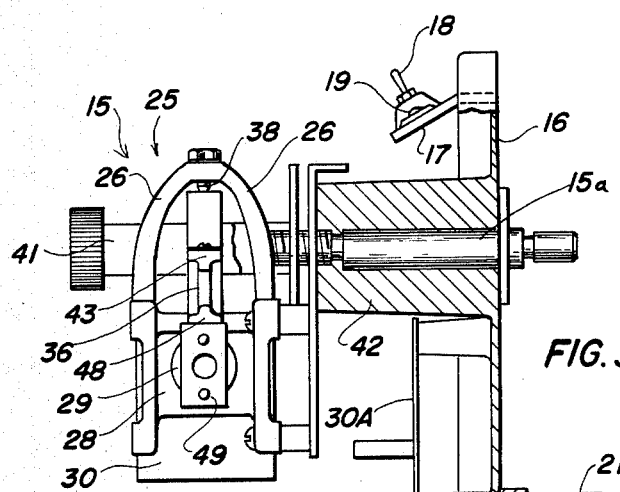
FIG. 3
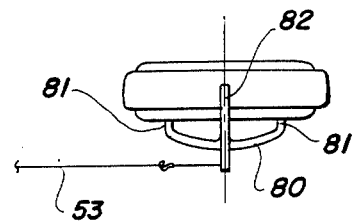
FIG. 8
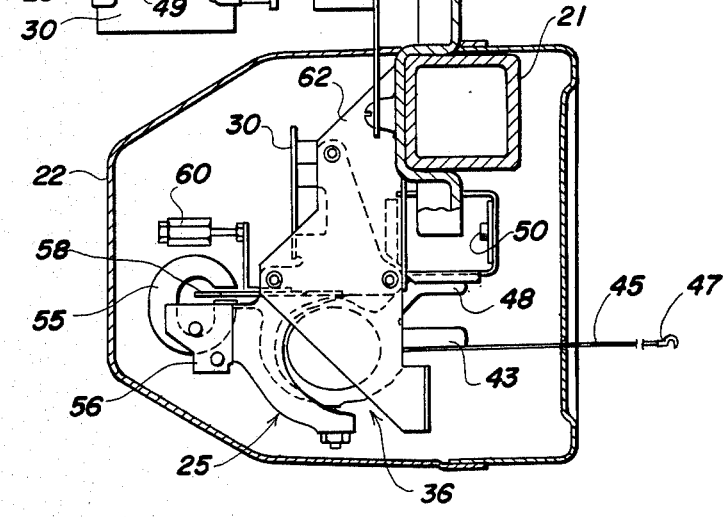

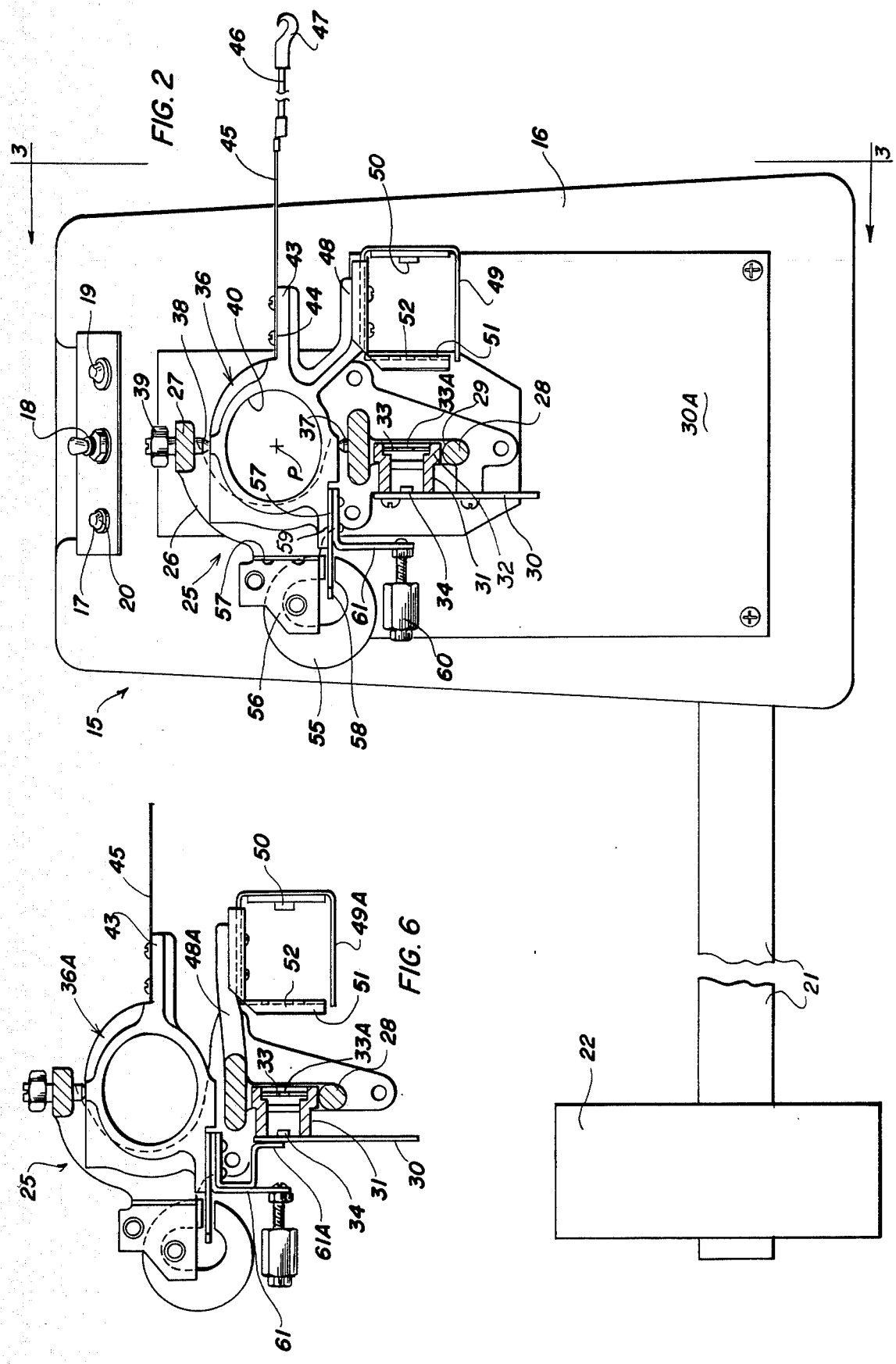

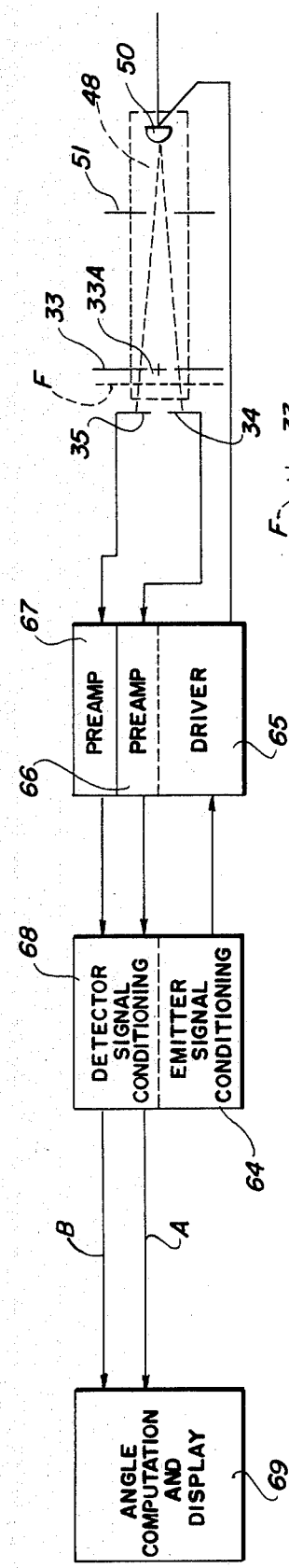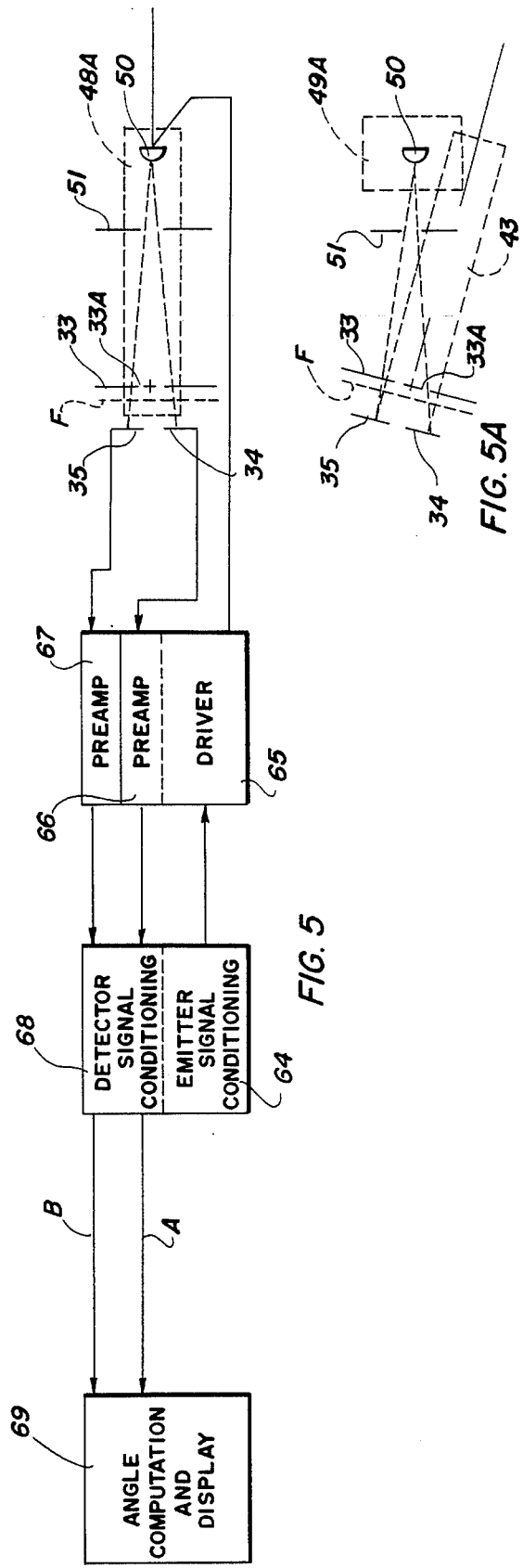

VEHICLE WHEEL ALIGNMENT APPARATUS

BACKGROUND OF THE INVENTION

1. Field of the Invention

This invention relates to vehicle wheel alignment apparatus, and particularly to the device of the apparatus which generates signals representative of the alignment position of the wheels.

2. Description of the Prior Art

Many different approaches have been tried for determining vehicle wheel alignment, some of which are all mechanical and some of which are electro-mechanical in make-up. In the relevant prior art, the mechanical devices are represented generally by the Manlove U.S. Pat. Nos. 3,164,910 of Jan. 12, 1965 and 3,181,248 of May 4, 1965. The mechanical components disclosed in these patents are arranged at the vehicle wheels and cooperatively connected by flexible lines for obtaining alignment data.

The electro-mechanical apparatus of the prior art is represented by such patents as MacMillan U.S. Pat. No. 3,443,318 of May 13, 1969, and Wilkerson U.S. Pat. No. 3,426,438 of Feb. 11, 1969. In these types of apparatus, electrical contacts are provided to make a circuit when the wheel position desired is reached. Somewhat more complex apparatus of the electro-mechanical character are represented by Senften U.S. Pat. No. 4,034,479 of July 12, 1977 and Hunter U.S. Pat. No. 4,106,208 of Aug. 15, 1978. These latter types generate signals which are fed into a console where meters display the information.

Some further relevant prior art is represented by Butler U.S. Pat. No. 3,865,492 of Feb. 11, 1975 which discloses apparatus using photo-electric receivers subject to a limited light source. In this same class is Hopkins et al U.S. Pat. No. 3,533,699 of Oct. 13, 1970, in which light responsive detectors are arranged to be activated more or less by the reflection of a light source off a mirror.

When alignment apparatus employs a light source which directly projects its beam toward detectors positioned at some distance, there is introduced the problem of obtaining the proper strength of the beam, and the further problem is also encountered of ambient light upsetting the signal strength or causing a false signal.

BRIEF SUMMARY OF THE INVENTION

The vehicle wheel alignment apparatus of this invention is an improvement upon and also differs in a unique manner from the apparatus disclosed in the prior application of Grossman and January Ser. No. 80,274, filed Oct. 1, 1979, now U.S. Pat. No. 4,319,838 of Mar. 16, 1982 and commonly assigned with the present application. In that prior disclosure, the source of radiant energy was carried on one of a pair of wheels which the radiant energy receiver pair was carried on the other wheel of the pair. As disclosed there the pair of receivers were mounted to represent the alignment position of the wheel, and the line or axis of the radiant energy source assumed the position of the wheel upon which it was carried. Thus, if the vehicle wheels were parallel to the reference axis of the vehicle the pairs of receivers generated substantially equal signal values. The separation of the radiant energy sources and the receivers by the wheel base and tread width dimensions called for stronger sources of energy because ambient light adversely affected the responses of the receivers, and the possibility of interrupting the radiant energy beam was a further problem.

The present invention overcomes those problems by improved alignment apparatus in which a radiant energy source of a pair of radiant energy responsive receivers are arranged in a common device carried by each of the respective wheels of a vehicle so as to be on opposite sides of an apertured mask. The respective radiant energy emitters of these devices are coupled together in pairs by flexible elastic lines which retain the radiant energy emitters in predetermined positions. In this way, the axis of the radiant energy beams have a predetermined relation to the vehicle reference axis, while the position of the apertured mask and the receivers represent the position of the vehicle wheels. The close coupling of the radiant energy emitters and the receivers has overcome the foregoing problems and has made the improved apparatus easier to use with better alignment results.

The present invention may be embodied in apparatus in which the windowed mask, the receivers and emitters may be supported so that some are movable and some are fixed.

The objects of the present invention are to provide vehicle wheel alignment apparatus with unique devices which develops strong signals due to the close coupling of radiant energy emitters and receivers; to provide such unique devices which are substantially unaffected by ambient light; to provide devices having means which can be easily located to have a predetermined position relative to the vehicle wheel on which it is carried and establish a base from which to determine wheel alignment data; and means operable with the flexible elastic lines to damp oscillations and disturbances of the position of the elastic lines.

BRIEF DESCRIPTION OF THE DRAWINGS

The present invention is illustrated in a preferred embodiment in the several drawings, wherein:

FIG. 1 is a schematic plan view of the present apparatus associated with the respective wheels of a representation vehicle;

FIG. 2 is a view in elevation of the apparatus seen from the side of and carried by the left steerable wheel of the vehicle, the view being taken along line 2—2 in FIG. 1;

FIG. 3 is a view taken along line 3—3 in FIG. 2 to illustrate the alignment devices associated with the left steerable vehicle wheel for longitudinal and transverse alignment response;

FIG. 4 is a block diagram of a typical circuit showing the electric components for the alignment devices of this invention;

FIG. 4A is a detail of the movable component in the diagram seen in FIG. 4;

FIG. 5 is a block diagram of a modified alignment device in which the movable component is different from that seen in FIG. 4;

FIG. 5A is a detail of the movable component in the modified apparatus seen in FIG. 5;

FIG. 6 is a view of the alignment apparatus similar to that seen in FIG. 2 but modified in accordance with the modification seen in FIG. 5;

FIG. 8 is an auxiliary device for use on the nonsteerable wheels when only the wheel toe alignment of the steerable wheels is to be checked.

DETAILED DESCRIPTION OF A PRINCIPAL EMBODIMENT

Figure 7:
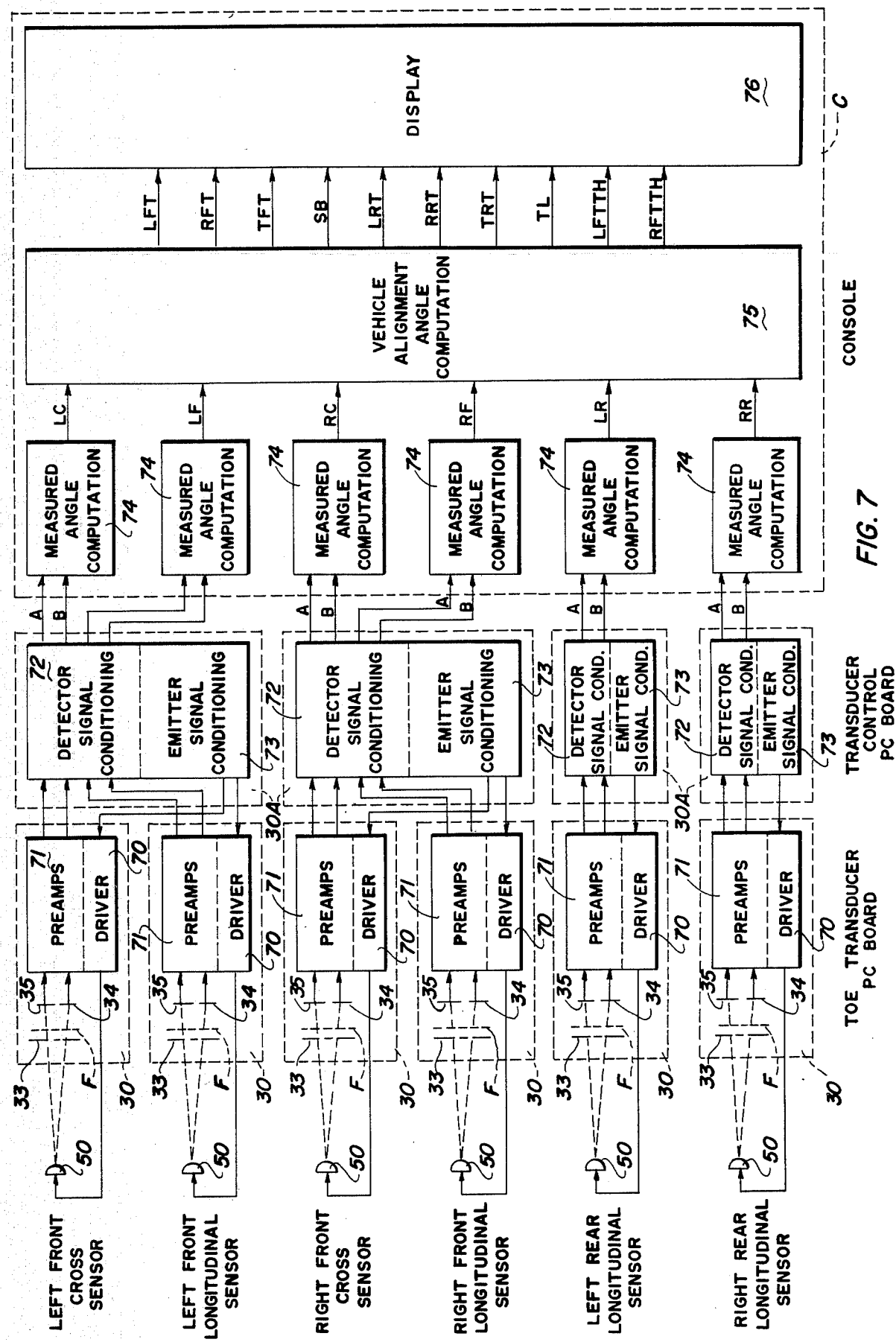
FIG. 7 is a block diagram of the complete alignment system layout to illustrate the processing of the alignment signals in a computer and the display thereof for the apparatus of this invention.

Referring now to FIG. 1 of the drawings, there is illustrated schematically vehicle steerable wheels 10 and 11 and the non-steerable wheels 12 and 13. Each of the wheels is engaged by an adapter 14 of a well known construction for the purpose of supporting an assembly 15 which includes the necessary electronic circuits associated with electronic run-out compensator for compensating the position of the apparatus electronically for wobble run-out. The run-out compensator, incorporated herein by reference, is of a type disclosed and described in the prior commonly assigned application of January et al, Ser. No. 172,815, filed July 28, 1980, now U.S. Pat. No. 4,336,658 of June 29, 1982. The purpose for electronically compensating for wobble run-out is to avoid the older mechanical adjustment devices so that signals can be transmitted to the circuitry in a console for purposes of correcting other signals to be generated by the improved device which is the subject of this invention.

Before describing the improved device in detail, it can be appreciated from FIGS. 2 and 3 that each of the steerable wheels 10 and 11 carries a support 16 (the cover having been removed) which is provided with a panel 17 for the actuating switch 18 and enunciator lamps 19 and 20. The switch 18 and lamps 19 and 20 form a part of electronic run-out compensator and are utilized to activate the wobble run-out circuit in the console C (FIG. 1) during the time when each of the wheels is rotated from a first position through a second position 180° away so as to electronically resolve any wobble or run-out that may be present. The switch 18 is actuated at each of the selected positions when the proper enunciator lamp is illuminated. The support 16 which is part of the assembly 15 is adapted to carry an arm 21 (FIGS. 1 and 2) which projects forwardly of the steerable wheels with which it is associated so that one of the improved devices of this invention may be carried in a housing 22 (FIGS. 1, 2 and 3) near the forward end of the arm 21. The assembly 15 (FIG. 3) is attached to the adapter 14 by means of the shaft 15a, and shaft 15a form the means for allowing the assembly to hang pendulously while the wheel is rotated during the compensating procedure.

The devices in the housing 22 at the outer ends of arms 21 are substantially identical with those disposed at the wheels, and are suitably interconnected by an elastic or flexible line 23 which is adapted to remain relatively taunt.

Referring more particularly to FIGS. 2 and 3 there is shown the improved device which is composed of a first support 25 which may be in the form of a casting having curved arms 26 joined at the top by a bridge 27 and joined at a point spaced below bridge 27 by a T-shaped bridge 28 which is formed with a circular aperture 29. The first support 25 carries a printed circuit board 30, and this board 30 supports a barrel 31 which has an enlarged head 32 for the purpose of supporting a mask means 33 formed with a window 33a. Behind the window 33a there are positioned a filter F and a pair of radiant energy detectors or receivers 34 and 35. The windowed mask 33 is preferably a flat element which is held by the barrel 31 in a position to be parallel with and spaced below the axis of rotation of the wheel with which it is associated. The pair of receivers 34 and 35 are electronically separated and are located in a plane substantially parallel with the plane of mask 33a. Furthermore, it is desired that the receivers 34 and 35 be positioned in the barrel so that when viewed from in front of the window 33a in the mask 33 the receivers are substantially equally visible (see FIG. 4).

The improved devices carry a second support 36 which is relatively movable by being mounted on a bottom pivot element 37 and a top pivot element 38. The pivot element 37 is fixed in the T-shaped bridge 28, while the pivot element 38 is adjustably mounted in the bridge 27 where it is more accessible and can be properly adjusted toward or away from fixed bridge 27 and secured in position by a jam nut 39. The second support 36 is a casting which is formed with circular opening 40 of a size to receive a spindle 41 (see FIG. 3) which is detachably mounted in an elongated boss 42 carried by the support 16. The circular opening 40 must be sized so that the second support 36 will have freedom to swing about the pivots 37 and 38 without interference from the spindle 41. The second support 36 is provided with a projecting arm 43 which has a flat machine surface 44 located to be in a position so that the flat surface intersects the axis of the spindle 41 as represented by the center point P. The surface 44 carries an arm 45 for the purpose of supporting a pig tail 46 having a hook 47 thereon. There is a second projecting arm 48 located below the arm 43 for the purpose of supporting a U-shaped frame 49 which carries a radiant energy emitter 50 in a position to be in alignment with the windowed mask 33. The arm 48 also supports a baffle 51 (see FIG. 2) having an opening 52 of a size to permit the radiant energy beam to pass through and also pass the mask 33. The baffle 51 is intended to shield the receivers behind the mask 33 from ambient light which would otherwise tend to dilute the strength of the radiant energy beam projected from the emitter beam 50.

It is understood that the second support 36 is pivotally carried by the first support 25 and is free to have limited angular motion for the purpose of causing the radiant energy beam from the emitter 50 to move to either side of a null or normal position where the axis of the radiant energy beam is directed to substantially equally excite the receivers 34 and 35, such as being in a position relative to the window of the mask 33 that the beam falls equally on the pair of receivers 34 and 35. The window 33a in the mask 33 is of a size to produce unequal exposure to the radiant energy beam when the emitter 50 is swung to either side of its normal position.

The hook 47 on the pig tail 46 is intended to be operably connected to a flexible or elastic line 53 which is directed along the longitudinal left side of the vehicle and is attached to a similar hook in the assembly 15 at the non-steerable wheel 12. A similar line 54 is positioned along the right hand side between the steerable wheel 11 and the non-steerable wheel 13. Similarly, the flexible line 23 is connected to the pig tail hooks associated with the improved devices mounted in the housings 22 on the arms 21 carried by the steerable wheels 10 and 11. A certain amount of tautness is desirable to stabilize the connected components.

It is by means of the arm 43 on the support 36 that pivoting displacement is achieved. However, the arm 43 is held in a set position by the pig tail being connected by a line to a distant object so the first support is able to assume a position representing the plane of rotation of the wheel. Such position may represent an angle.

It is recognized that the lines 53, 54 and 23 may be caused to vibrate because of air currents or because of being struck, or for a number of other reasons which would result in vibration of one or more of these lines. In order to damp out vibrations each of the improved devices is provided with a magnetic damper which is illustrated in FIG. 2. A horse shoe magnet 55 is securely clamped in a bracket 56, and the bracket is attached to the first support 25 at flanges 57. The magnetic field created by the magnet 55 is occupied by a conductor 58 in the form of a copper plate which is secured to the second support 36 at a surface 59. It is understood that the motion of the conductive plate 58 through the magnetic field induces a force in the plate 58 which is opposed to the direction of movement of the conductive plate and thereby tends to prevent the movement of the plates. Thus, when one of the flexible lines 53, 54 or 23 is caused to vibrate, the conductive plate 58 in each device responds and vibrates sympathetically so that the magnetic damping action in the field of the magnet 55 will quickly restore the stable position of the second support 36, whereby the emitter 50 is prevented from vibrating and can excite the receivers 34 and 35 to produce stable signal responses. It is important to note that the magnet 55 induces no forces in the plate 55 unless the two parts 55 and 58 are in motion relative to each other. These parts act as a frictionless damper, and so cannot affect the positioning of the supports 25 and 26 provided they are at rest.

A counter weight 60 is carried on a bracket 61 which is anchored to the second support 36 simultaneously with the anchorage of the conductor plate 58. It is recognized that steerable wheel camber may cause the improved device to assume slightly tilted positions and the counter weight 60 is intended to off-set or correct the tilting effect on the intended alignment position of the emitter 50.

The signals generated by the receivers 34 and 35 in the improved devices carried by the respective steerable and non-steerable wheels are transmitted to the console C by leads which are shown but not designated by reference numerals. The electronic circuit involved in connection with the assemblies shown in FIG. 1 is described in more detail in the application of Grossman and January, Ser. No. 80,274, now U.S. Pat. No. 4,319,838 of Mar. 16, 1982 and such disclosure is incorporated by reference herein as to the computation of the angles, with certain differences to be pointed out.

As pointed out before, each device is substantially the same, so the devices carried near the outer ends of the toe arms in housings 22 are represented by the showing of one thereof in FIG. 3 with part of the housing removed. The device must, however, be mounted up-side-down in order to match the support bracket 62 which is provided on the arm 21. It is not believed necessary to fully describe the toe arm mounted device of FIG. 3, it being sufficient to point out characteristic components by reference numerals applied to the device in FIG. 2.

Referring now to FIG. 4, it can be seen that the electronic circuit arrangement for the circuit board 30 in FIG. 2 includes driver 65 for the emitter 50. The receivers 34 and 35 may be photodiodes having respective preamplifier means 66 and 67 for converting the current generated by the photodiodes into voltage. The voltage signals are processed in conditioning means 68 to produce output signals A and B. The means 68 electronically filters the amplifier signals to isolate the emitter signals and eliminate intereference due to noise and ambient light. A filter F is generally used and is matched to the optical spectrum of the emitter signal, which signal may be a square wave or sine wave at audio frequency so that the receiver signals are conditioned by bandpass filters whose center frequency matches the emitter signal. Angular information is obtained by processing the receiver signals in separate circuits or in time shared circuit means, in signal computer means 69 located in the computer in console C. The signals generated by the radiant energy from emitter striking the receivers 34 and 35 varies in proportion to the area of the receiver which is exposed to the radiant energy. Thus, in FIG. 4 the receivers are equally exposed and are in a 'null' alignment relative to the emitter position. When the arm 48 carrying the emitter 50 is held, and the position of the wheel is at some angle A to the axis of the emitter beam, the receivers 34 and 35 are unequally exposed and generate signals proportioned to the angle A. It is deemed simpler to illustrate this angular deviation as seen in FIG. 4A.

While the emitter 50 of FIG. 2 is shown as carried by the movable element in the devices, and the filter F and receivers 34 and 35 are fixed in position, it is within the scope of the present improvement to hold the position of the axis of the radiant energy beam from emitter 50 relative to the wheel and mount the receivers on the pivoted support 36 of the device, thereby obtaining equivalent signals which can be processed to determined wheel alignment information. As shown in FIG. 6, the modification of the device is achieved by altering the second support 36A by removing arm 48 as shown in FIG. 2 and providing an arm 48A on the T-web 28 of the first support 25. It is necessary further to detach the printed circuit board 30 from the first support 25 and mount it on a bracket 61A from the same place on the second support 36A where the counter weight bracket 61 is attached to the support 36A. This second modification will now result in the board 30 and the barrel 31 being carried with the pivoted second support 36A, while the bracket 49A on the arm 48A stays with the first support 25. Thus, the receivers 34 and 35 in barrel 31 move with the pivoted second support while the emitter 50 is carried by the first support 25. The filter F, windowed mask 33, and receivers 34 and 35 move as a unit on an arc that has insignificant positional shift away from the alignment with the pivot axis P for the wheel.

FIG. 7 is a block diagram of the circuit for the alignment instrumentation seen in FIG. 1. In this diagram the instrument in the housing 22 on the toe arm 21 is identified as the left front cross sensor which includes the emitter 50, the receivers 34 and 35, the windowed mask 33, a filter F, the emitter driver 70, and the preamps 71 for the receiver signals. The preamp signals are transmitted to the PC board 30A on the support 16 at the left front wheel 10, and the power for the emitter driver 70 comes from the PC board 30A. The instrument on the support 16 at the left front wheel 10 for developing longitudinal alignment information is provided with its separate PC board 30. The signals from the left front cross sensor and from the left front longitudinal sensor are collected on the PC board 30A in detector signal conditioning circuit means 72 and emitter signal conditioning circuit means 73. The information collected in circuit means 72 and 73 is transmitted to the console C where computation for measured angles takes place in circuit means 74 and 75.

Instrumentation for the right side of the vehicle includes the right front cross sensor in the housing 22 on the toe arm 21 at wheel 11. Also, the wheel 11 carries the right front longitudinal alignment sensor. The signals from these sensors are collected on the common PC board 30A in detector signal conditioning circuit means 72 and emitter signal conditioning circuit means 73. The collected signals on PC board 30A are sent to the console C for measured angle computation in circuit means 74 and 75.

The instrumentation on the non-steerable wheel 12 is not as complicated. For example, the left rear longitudinal sensor generates signals which are processed in the preamp circuit 71 and driver circuit 70, these being connected into a detector signal conditioning circuit means 72 on the PC board 30A. The driver circuit 70 for the left rear longitudinal sensor emitter 50 is connected to the emitter signal conditioning circuit means 73. From the circuits on the PC board 30A, signals are fed into the console C for measured angle computation circuit means 74. Similarly, the right rear longitudinal sensor on the non-steerable wheel 13 is provided with circuit means on the PC board 30 in cooperation with circuit means on PC board 30A. The processed signals are fed into the measured angle computation circuit means 74 in the console C.

The measured angle computation circuit means 74 associated with the respective sensors, which develop angle information at the wheels, generate values LC for the left cross toe angle, LF for the left front longitudinal angle, RC for the right cross toe angle, RF for the right front longitudinal angle, LR for the left rear longitudinal angle, and RR for the right rear longitudinal angle. These angle values are fed into the vehicle alignment angle computation circuitry 75 where further processing takes place such that the eventual information on alignment can be displayed at suitable meters or other devices represented generally at 76. The displays will furnish values for left front toe LFT, right front toe RFT, total front toe TFT, set back SB, left rear toe LRT, right rear toe RRT, total rear toe TRT, thrust line TL, left front toe relative to the thrust line LFTTH, and right front toe relative to the thrust line RFTTH. The computation for these several displays is set forth in the prior application Ser. No. 80,274 (supra) which is included by reference.

Alternative to the mounting of the wheel alignment devices at each of the vehicle wheels, the devices at the non-steerable wheels 12 and 13 may be removed, or not used, and simple fixtures attached to these wheels. Such a fixture is shown in the patent of Florer et al U.S. Pat. No. 4,095,902. As seen in FIG. 8, each fixture has a frame 80 with fingers 81 which engage the wheel rim, and a hanger arm 82 which is placed so a hook thereon engages the top of the wheel. The fingers 81 hold the frame 80 at a distance from the plane of the wheel, which distance may be substantially the same as the spacing (FIG. 1) of the arm 43 in the assembly 15 from the plane of the steerable wheels. The ends of the flexible lines 53 and 54 can be anchored by the use of such a frame 80 at each non-steerable wheel 12 and 13. This modified arrangement is useful when it is desired to determine the individual steerable wheel toe alignment in reference to the longitudinal axis of the vehicle. It is necessary to have information signals from both of the devices carried by the steerable wheels so that these signals can be fed into the computer at the console C and wheel toe measurements displayed in the manner referred to above.

While particular preferred embodiments of the present invention have been shown and described, it is to be understood that the invention is not to be unnecessarily limited as modifications may be made which result in substantial equivalents of the components herein disclosed, and such equivalents will be recognized in view of the teaching herein disclosed which is desired to be protected.

What is claimed is:

1. A vehicle wheel alignment device, the device being carried on a vehicle wheel and comprising:
   (a) first support means carried by the vehicle wheel in a position to represent an alignment characteristic of the wheel;
   (b) second support means carried by and movable relative to said first support means about an axis such that said first and second support means are able to undergo relative angular displacement about said axis;
   (c) windowed mask means carried by one of said support means;
   (d) a pair of radiant energy beam receivers and a radiant energy beam emitter carried by different ones of said support means, and said receivers and emitter being on opposite sides of said windowed mask;
   (e) baffle means between said mask and emitter and in position for shielding said receivers from ambient light; and
   (f) means on said second support means adapted for retaining said second support means in a set position independent of the wheel and relative to the position of said first support means which represents the wheel alignment characteristic, the alignment characteristic of the wheel determining the alignment of the emitter beam axis relative to said pair of radiant energy receivers, and said windowed mask determining the relative exposure of each receiver of said pair of radiant energy receivers in response to the angular displacement between said first and second support means.

2. The vehicle wheel alignment device set forth in claim 1 wherein said pair of receivers are mounted on said first support means, and said radiant energy beam emitter is carried on said second support means.

3. The vehicle wheel alignment device set forth in claim 1 wherein said pair of receivers are mounted on said second support means, and said radiant energy beam emitter is carried on said first support means.

4. The vehicle wheel alignment device set forth in claim 1 wherein said second support means in pivotally attached to said first support means for movement about a pivoting axis which intersects the axis of rotation of the wheel.

5. The vehicle wheel alignment device set forth in claim 1 wherein said pair of radiant energy beam receivers are spaced apart and are in the same plane which is substantially parallel with the plane of said windowed mask means.

6. The vehicle wheel alignment device set forth in claim 1 wherein said pair of radiant energy beam receivers are positioned relative to said windowed mask means so they are substantially equally visible to said radiant energy beam when said beam is aligned substantially perpendicularly to the plane containing said windowed mask means.

7. A signal generating device for use on a wheel in vehicle wheel alignment apparatus wherein the signal generating device comprises:
   (a) first support means attached to a vehicle wheel in a position for representing an alignment characteristic of the wheel;
   (b) second support means mounted on said first support means in position to swing toward or away from the vehicle wheel and relative to said first support;
   (c) signal generating means carried by said first and second support means including:
      (1) a pair of radiant energy receivers positioned in spaced relation and attached to one of said support means;
      (2) a windowed mask spaced from said pair of emitters and attached to said one of said support means so as to assume a position in alignment with the normal axis of rotation of the vehicle wheel; and
      (3) a radiant energy beam emitter attached to the other one of said support means in position to direct its beam through the window of said windowed mask to impinge upon said radiant energy receivers; and
   (d) means on said second support means in position to swing said second support means toward or away from the vehicle wheel whereby said radiant energy receivers and said radiant energy beam emitter assume positions relative to said windowed mask in which the beam impinges on said pair of receivers varying from equality of impingement to inquality impingement for generating signals of corresponding character.

* * * * *